(12) United States Patent
Garner et al.

(10) Patent No.: US 9,877,425 B2
(45) Date of Patent: Jan. 30, 2018

(54) SEED BOOT AND LINER ASSEMBLY

(71) Applicant: Deere & Company, Moline, IL (US)

(72) Inventors: Elijah B. Garner, Bettendorf, IA (US); Jerry Samuelson, Woodhull, IL (US)

(73) Assignee: Deere & Company, Moline, IL (US)

( * ) Notice: Subject to any disclaimer, the term of this patent is extended or adjusted under 35 U.S.C. 154(b) by 58 days.

(21) Appl. No.: 14/872,476

(22) Filed: Oct. 1, 2015

(65) Prior Publication Data

US 2017/0094895 A1    Apr. 6, 2017

(51) Int. Cl.
    *A01C 5/06*    (2006.01)
    *A01C 23/02*   (2006.01)
    *A01C 7/20*    (2006.01)

(52) U.S. Cl.
    CPC .............. *A01C 7/20* (2013.01); *A01C 5/062* (2013.01); *A01C 5/064* (2013.01); *A01C 7/206* (2013.01); *A01C 23/025* (2013.01)

(58) Field of Classification Search
    CPC combination set(s) only.
    See application file for complete search history.

(56) References Cited

U.S. PATENT DOCUMENTS

| | | | | |
|---|---|---|---|---|
| 18,843 A | * | 12/1857 | Haines | A01C 5/062 111/154 |
| 105,866 A | * | 7/1870 | Thomas | A01C 5/062 111/154 |
| 339,302 A | * | 4/1886 | Keller | A01C 5/062 111/152 |
| 1,116,525 A | | 11/1914 | Winwood, Jr. | |
| 1,691,466 A | * | 11/1928 | Burtner | A01C 5/062 111/150 |
| 2,106,645 A | * | 1/1938 | Moorhead | A01C 21/002 111/77 |
| 2,768,591 A | * | 10/1956 | James | A01C 23/025 111/124 |
| 2,843,066 A | * | 7/1958 | Dugan | A01C 23/025 111/119 |
| 3,092,052 A | * | 6/1963 | Andersen | A01C 23/025 111/123 |
| 3,834,330 A | * | 9/1974 | Wallace | A01B 17/00 111/123 |
| 4,562,780 A | * | 1/1986 | Leiblich | A01C 5/064 111/140 |
| 4,638,748 A | * | 1/1987 | Kopecky | A01C 5/06 111/124 |
| 5,092,255 A | | 3/1992 | Long et al. | |
| 5,271,342 A | * | 12/1993 | Neidhardt | A01C 23/025 111/119 |
| 6,178,901 B1 | | 1/2001 | Anderson | |
| 6,209,466 B1 | * | 4/2001 | Wodrich | A01C 5/062 111/189 |

(Continued)

OTHER PUBLICATIONS

European Search Report for Application No. 16191088.0 dated Feb. 27, 2017.

*Primary Examiner* — Alicia Torres
(74) *Attorney, Agent, or Firm* — Lorenz & Kopf, LLP (57) ABSTRACT

A seed boot assembly for a seeding machine includes a seed boot, a boot liner and a seed tube adapter. The seed boot has a seed passage extending from an inlet to an outlet. The boot liner extends within the seed passage between the inlet and the outlet. A seed tube adapter is coupled to the seed boot and/or the boot liner.

18 Claims, 5 Drawing Sheets

(56) References Cited

U.S. PATENT DOCUMENTS

| | | | |
|---|---|---|---|
| 7,077,070 B1 * | 7/2006 | Williams | A01C 23/024 |
| | | | 111/121 |
| 7,168,376 B2 | 1/2007 | Johnson | |
| 9,192,095 B1 * | 11/2015 | Bergmeier | A01C 23/025 |
| 2002/0144637 A1 * | 10/2002 | Wendling | A01C 7/082 |
| | | | 111/163 |
| 2012/0169353 A1 * | 7/2012 | Sauder | A01C 7/105 |
| | | | 324/629 |

* cited by examiner

SEED BOOT AND LINER ASSEMBLY

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

The present invention is directed to a seed boot assembly for a seeding machine.

BACKGROUND OF THE DISCLOSURE

Seeding machines, such as air seeders and gravity-fed seeders, may be used for planting seeds. For example, seeds from a supply hopper may be delivered to seed meters associated with individual planting units. Each seed meter may meter seed through a seed tube. A furrow opener of the planting unit may create a planting furrow immediately in front of the end of the seed tube. A seed boot may be attached to the seed tube to direct the seed into the planting furrow, which may be closed by a furrow closing wheel of the planting unit.

SUMMARY OF THE DISCLOSURE

The disclosure provides a seed boot assembly for a seeding machine in which a boot liner is provided within the seed boot.

In one aspect the disclosure provides a seed boot assembly for a seeding machine and includes a seed boot, a boot liner and a seed tube adapter. The seed boot has a seed passage extending from an inlet to an outlet. The boot liner extends within the seed passage between the inlet and the outlet. A seed tube adapter is coupled to the seed boot and/or the boot liner.

In another aspect the disclosure provides a planting unit for a seeding machine. The planting unit includes a planter unit frame, a furrow opener disk rotatably mounted to the planter unit frame and a seed boot assembly. The seed includes a seed boot, a boot liner and a seed tube adapter. The seed boot has a seed passage extending from an inlet to an outlet. The boot liner extends within the seed passage between the inlet and the outlet. A seed tube adapter is coupled to the seed boot and/or the boot liner.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed seed boot assembly and planting unit, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

In certain seeding applications it may be useful to provide a seed boot at the end of the seed tube through which seed is metered or otherwise delivered from the planting unit. The seed boot may be located in close proximity to an opener disk or other planting furrow forming assembly so that the seed may be delivered in close proximity to the planting furrow. The seed boot may have a seed passage following a rearward, angled path that imparts a rearward force on the seeds with respect to a direction of travel of the planting unit, which may be part of a seeding machine implement towed by an agricultural tractor. The location and configuration of the seed boot may also allow it to aid in maintaining a suitable furrow opening through which the seed may be dispensed into the planting furrow.

It may be useful to line the seed boot with a boot liner. For example, the seed boot may be a casting with associated rough, unfinished and/or uneven interior surfaces forming the seed passage through the boot. Lining the seed boot with a smooth surface interior surface along the seed passage may improve seed flow through the seed passage in a cast seed boot. The smooth interior surface of the boot liner may allow for more consistent seed flow with reduced likelihood of seeds being slowed or caught within the seed boot, thus allowing for more consistent seed delivery and spacing in the planting furrow.

In certain embodiments, the boot liner may be closely fit to the interior surfaces so as to form an overlay of the interior surfaces of the seed boot forming the seed passage. In this case, the seed passage may have essentially the similar geometry as the seed boot in its unlined state. However, with the boot liner, the interior surface of the seed passage may have a smoother surface finish. In other embodiments, an overlay boot liner may be closely fit to the interior surfaces of the seed boot, but the boot liner may change the cross-sectional profile of the interior surfaces of the seed passage. For example, the boot liner may smooth or round certain squared or linear internal geometries of the seed boot or may enlarge the radius of certain small radius internal features of the seed boot. The boot liner may be configured to change the internal geometry from an inconsistent cross-sectional profile to a profile having a consistent, smoothly transitioned and/or identical cross-section, for example, to provide a seed passage having a circular cross-section for a seed boot that has a non-circular internal geometry. Boot liners of this type may be formed in a coating or molding process.

In other embodiments, the boot liner may be a separate component that inter-fits with the seed boot to define the seed passage largely disassociated with the internal geometry of the seed boot. In this case, the boot liner need only fit within the internal space of the seed boot and extend some of, or all, the way through the seed boot. The boot liner may have its own geometry such that it is spaced from the interior walls of the seed boot at some, or even all, locations within the seed boot. The boot liner may provide a smooth seed passage that is largely independent of the geometry of the seed boot. The boot liner may form a smooth, circular or oval cross-section. The boot liner may form a smooth seed passage from end to end, including defining one or more straight or curved sections without sharp angles or with larger radius areas than would have been provided by the seed boot otherwise. In certain embodiments, the boot liner may be formed by a rigid or flexible tubular member.

In certain embodiments, the seed boot assembly may also define a nozzle outlet that aids in focusing the direction which the seeds travel when passing from the seed boot to the planting furrow, thereby focusing the spray pattern and reducing the occurrence of seeds being deposited outside of, or not at the bottom of, the planting furrow. The outlet nozzle may be formed in various ways, including as a separate attachment to the seed boot and/or the boot liner, or the seed boot and/or the boot liner may define the nozzle. By way of example, the seed boot may have a lower end that narrows in one or more dimensions, and the boot liner may be configured to narrow correspondingly. In one example, the rigid seed boot is formed with such a narrowed configuration and the boot liner is a flexible tube that conforms to fit within the narrowed section of the seed boot.

The seed tube of the planting unit may couple to the seed boot directly, with the seed tube coupling with the boot liner indirectly, or the seed tube may couple directly to the seed tube. Alternatively, an adapter component may be included in the seed boot assembly. The adapter may connect to the seed boot and act as an intermediary between the seed tube and the boot liner. The adapter may be secured by mechanical fasteners, such as a threaded fastener at the seed boot and a tube clamp at the seed tube. The adapter may define a smooth interior surface that smoothly transitions from the seed tube to the boot liner. The internal passage defined by the adapter may be larger at the seed tube end and narrower at the boot liner end, narrowing continuously there between without downstream blocking (or inwardly projecting) surfaces at the transition between the seed tube and the adapter and at the transition between the adapter and the boot liner. In this way, flow from the seed tube to the boot liner will not be inhibited at the adapter interface locations. Further, the adapter may be configured to define an offset angle that facilitates a straighter passage between the seed tube and the boot liner.

Referring now to the figures of the drawings, one or more example seed boot assemblies will be described in detail. It should be understood that other seed boot and/or boot liner configurations may be within the scope of this disclosure, which is thus not to be limited by the illustrated example described below. Moreover, the example seed boot assembly is described with respect to an example planting unit having a seed meter dispensing seeds under gravity. However, the seed boot assembly of this disclosure may be used with other planting unit assemblies utilizing other seed meters or other seed dispensing mechanisms, including air delivery systems and the like.

Figure 1:
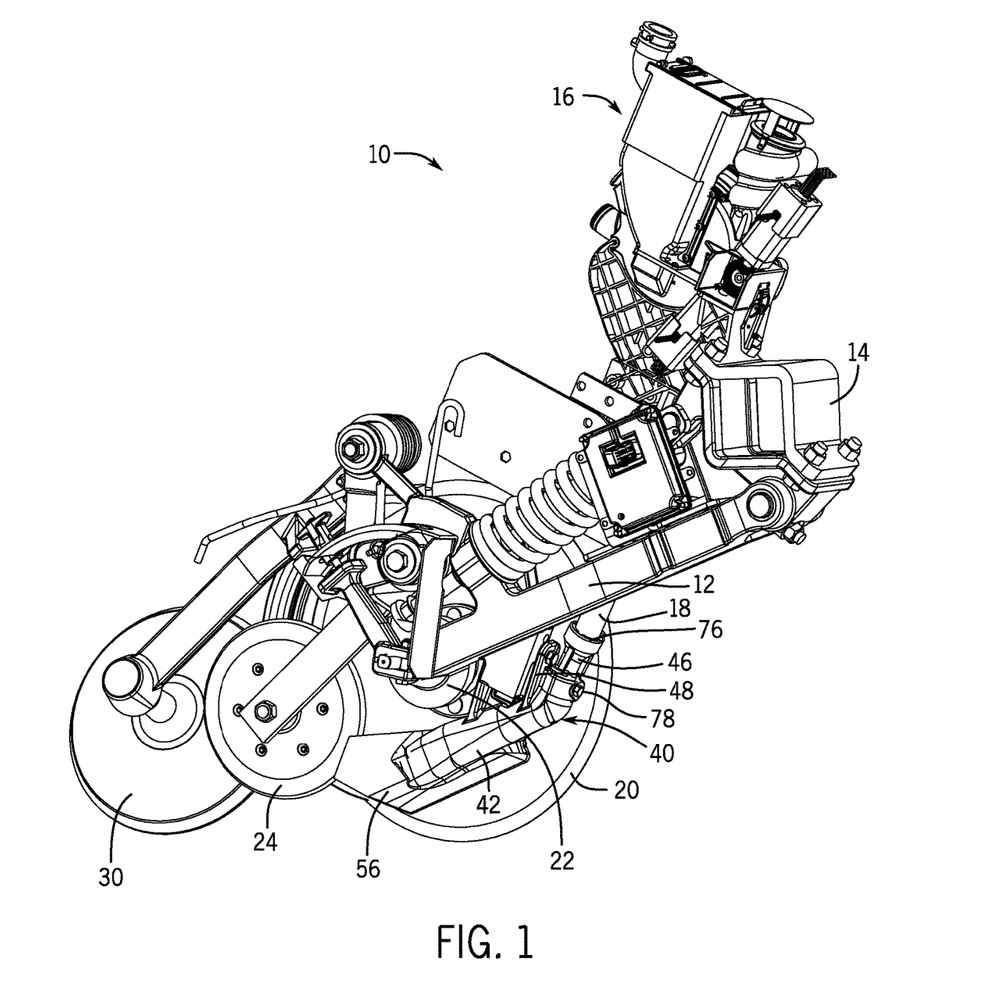
FIG. 1 is a perspective view of a planting unit for a seeding machine in which a seed boot assembly of this disclosure may be incorporated.

FIG. 1 discloses an individual planting unit 10 for a seeding machine. The planting unit 10 has a planting unit frame 12 that is coupled to the seeding machine frame by a bar clamp 14. The planting unit frame 12 mounts a seed meter assembly 16 including a mini-hopper, which holds an accumulated collection of seed from the main seed hopper(s) on the seeding machine or a commodity cart associated with the seeding machine. In alternative constructions, the seed meter may be remote from the planting unit 10, and the seed may be delivered to the planting unit by gravity or pneumatically. In the illustrated example, the seed meter assembly 16 dispenses individual seeds from the mini-hopper to a seed tube 18 that extends down from a lower part of the planting unit 10. The seed tube 18 in the illustrated example is a 1-1¼ inch inner diameter plastic or metal tube.

The planting unit frame 12 mounts a single disk furrow opener 20 that may rotate relative to the planting unit frame on a bearing assembly 22. The furrow opener 20 cuts into the ground to form a planting furrow into which the metered seed is deposited. A rotating seed press wheel 24 is mounted to the planting unit frame 12 behind the furrow opener 20 for pressing deposited seeds into the planting furrow. Mounted to the planting unit frame 12 immediately behind the seed press wheel 24 is a rotating closing wheel 30 for collapsing the planting furrow and covering the deposited seeds with a loose layer of soil.

Referring also to FIGS. 2-5, metered seed is directed from the seed tube 18 downwardly into a seed boot assembly 40. The seed boot assembly 40 includes a seed boot 42 and a boot liner 44. The seed boot 42 and/or the boot liner 44 may couple directly to the seed tube 18, or an adapter 46 may also be included in the seed boot assembly 40 for coupling the seed boot assembly 40 to the seed tube 18. In certain embodiments, the seed boot 42 may be a rigid assembled or monolithic component and the boot liner 44 may be a rigid or flexible tubular member, each made of any suitable metal or non-metal material.

Figure 2:
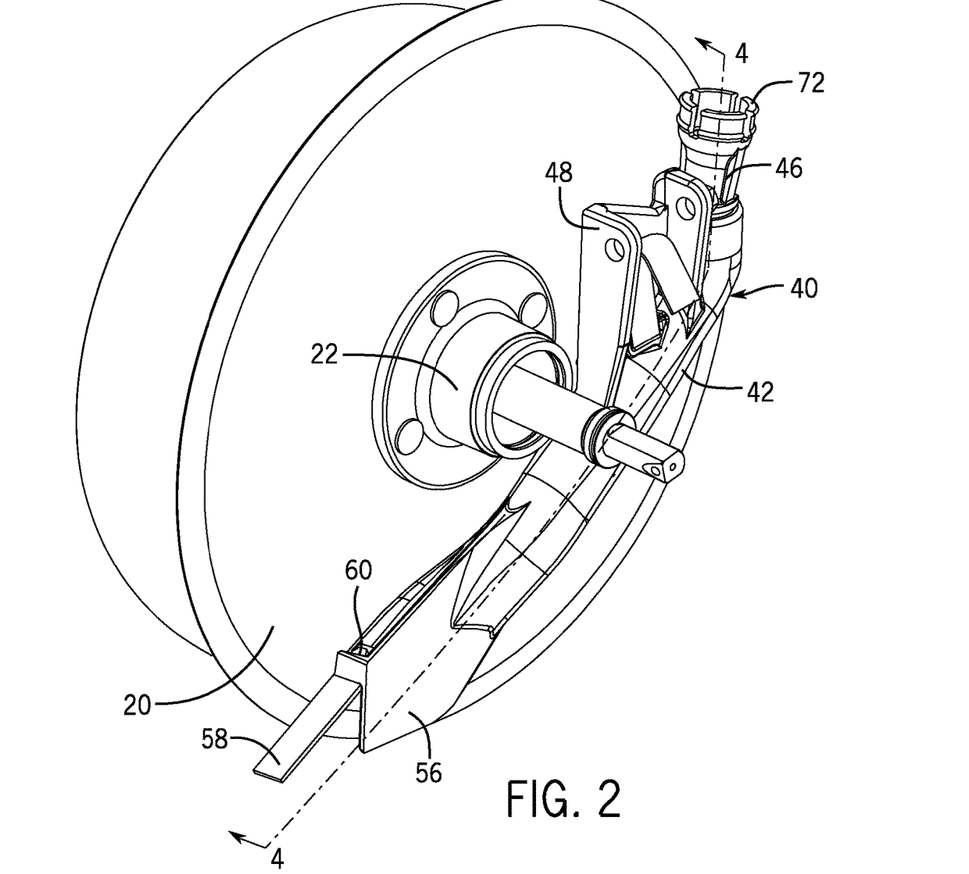
FIG. 2 is a perspective view showing the seed boot assembly and a furrow opener thereof.
Figure 3:
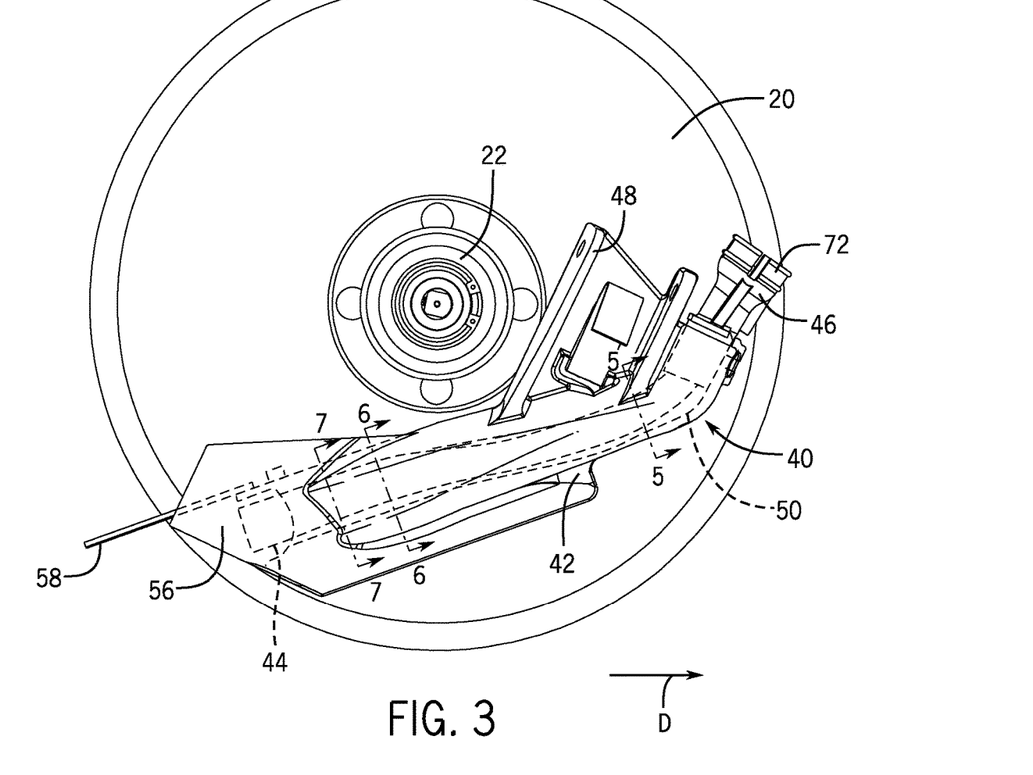
FIG. 3 is a side view thereof.
Figure 4:
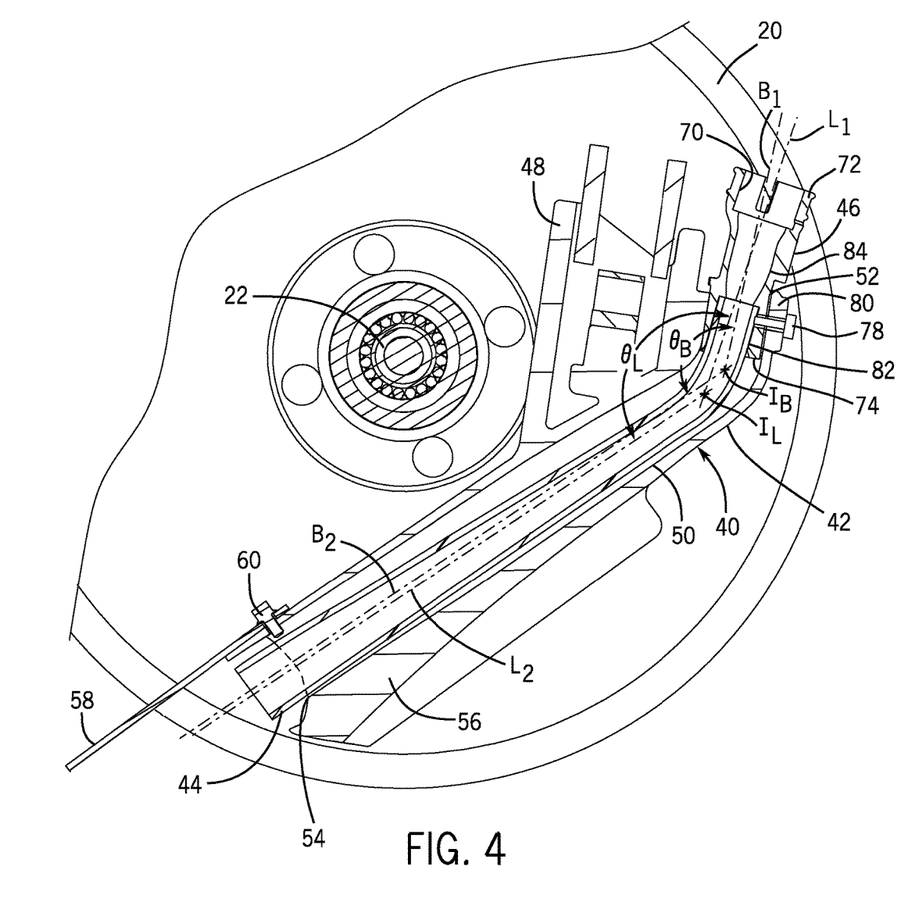
FIG. 4 is a partial side sectional view thereof taken along line 4-4 of FIG. 2 showing the seed boot with a boot liner therein.
Figure 5:
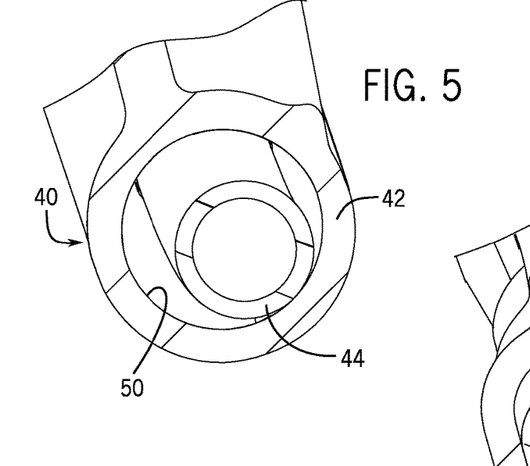
FIGS. 5-7 are enlarged partial sectional views thereof taken along respective lines 5-5, 6-6 and 7-7 of FIG. 3.

In the illustrated example, the seed boot 42 may be a monolithic cast part in which the exterior and interior surfaces are formed in the same casting operation. The seed boot 42 mounts to the planting unit frame 12 by an integrally formed mounting tab 48 and one or more mounting bolts. The seed boot 42 defines an internal cavity 50 that has an inlet end 52 and an outlet end 54. The inlet end 52 is located in front of the mounting tab 48 and the bearing assembly 22, with respect to a direction of travel D of the planting unit 10. The outlet end 54 is located below and behind the mounting tab 48 and the bearing assembly 22. An integrally formed vane 56 projects downward and rearward from the outlet end 54. A seed flap 58, made of a thin metal or plastic strip, is mounted to the vane 56 by a mechanical fastener (e.g., mounting screw 60) to project further downward and rearward from the outlet end 54.

Figure 6:
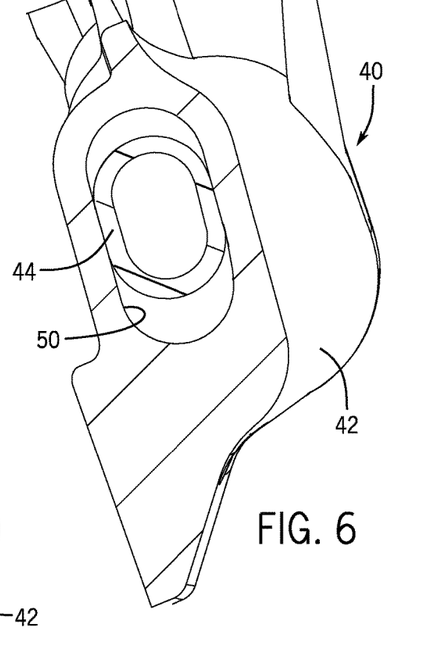
Figure 7:
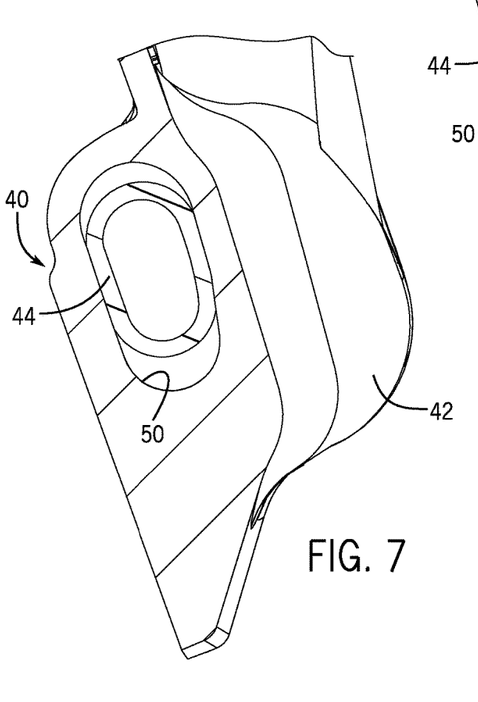

The seed boot 42, and the internal cavity 50, has an angled configuration, mounted to the planting unit frame 12 to extend downward and rearward, as mentioned. The inlet end 52 of the seed boot 42, and the internal cavity 50, is generally centered about a first reference axis $B_1$ which intersects a coplanar second reference axis $B_2$ about which is centered the outlet end 54, and a majority of the length of the internal cavity 50. In the illustrated example, the reference axes $B_1$ and $B_2$ intersect at an intersection point $I_B$ and form an included angle $\theta_B$ of about 135 degrees. The internal cavity 50 has an inner diameter at the inlet end 52, and an inner, non-circular cross-sectional dimension throughout much of its length, of about 1¼-1½ inches. However, as shown in FIGS. 6 and 7, the internal cavity 50 transitions to be more oblong, in particular, generally having a smaller lateral (sideways) dimension than its height dimension at the outlet end 54.

In the illustrated example, the boot liner 44 is flexible and made of suitable plastic material, such as a crosslinked polyethylene ("PEX"), with a circular cross-section and an inner diameter of about 17 mm and an outer diameter of about 22 mm. The boot liner 44 forms an "inner tube" when disposed in the internal cavity 50 of the seed boot 42. Given the size difference of the boot liner 44 and the internal cavity 50 of the seed boot 42, the boot liner 44 is arranged in the seed boot 42 with its outer surface spaced from the inner surface of the seed boot 42. This allows the boot liner 44 to provide a passageway that is downward and rearward like the internal cavity 50, but at a different, larger radius or that is less sharply-angled. In the illustrated example, the portion of the boot liner 44 at the inlet end 52 of the seed boot 42 is generally centered about a first reference axis $L_1$ which intersects a coplanar second reference axis $L_2$ about which is centered a second portion of the boot liner 44 at the outlet end 54 of the seed boot 42 (and a majority of the length of the boot liner 44). In the illustrated example, the reference axes $L_1$ and $L_2$ intersect at an intersection point $I_L$ and form an included angle $\theta_I$ of about 145 degrees. The boot liner 44 has a larger radius of curvature (by about 10 degrees) at a lower intersection point that is spaced further from the inlet end 52, thus providing a more gradual (straighter) passageway for the seeds. As noted above and shown in FIGS. 6 and 7, as the internal cavity 50 transitions to oblong, the flexible boot liner 44 also takes an oblong cross-section having a smaller lateral (sideways) dimension than its height dimension at the outlet end 54.

In the illustrated example, the seed tube adapter 46 connects to the seed tube 18 at a cavity 70 at the first end 72 and to the seed boot 42 and boot liner 44 at a second end 74. The first end 72 (the upper end as shown in FIGS. 3-4) may be split into tabs about which a tube clamp 76 may be fit to tighten the adapter 46 about the lower end of the seed tube 18. The second end 74 (the lower end in FIGS. 3-4) of the adapter 46 may be fit into the inlet end 52 of the seed boot 42 and be secured by a threaded fastener 78 fit through an opening 80 in the seed boot 42. The second end 74 of the adapter 46 may have a cavity 82 that receives the (upper) end of the boot liner 44. Friction, adhesives or a mechanical fasteners may be used to secure the boot liner 44 to the adapter 46.

The adapter 46 has a transition section 84 between the cavities 70, 82 with a smooth interior surface that smoothly transitions from the seed tube 18 to the boot liner 44. Since, in the example configuration the seed tube 18 has a larger open area than the boot liner 44, the interior surface of the transition section 84 of the adapter 46 narrows from the cavity 70 to the cavity 82. The transition section 84 of the adapter 46 in the illustrated example is configured so that the open area at the upper end of the passage is the same or slightly larger than the open area of the seed tube. The transition section 84 of the adapter 46 is also configured so that the open area at the lower end of the passage is the same or slightly smaller than the open area of the boot liner 44. This configuration reduces or eliminates the presence of surfaces that could block flow of seeds at the transitions between the seed tube 18 and the adapter 46 and between the adapter 46 and the boot liner 44. Further, the adapter 46 of the illustrated example is configured with an offset angle, which may match the difference between included angles $\theta_B$ and $\theta_L$ (e.g., 10 degrees), and which facilitates a straighter passage between the seed tube 18 and the boot liner 44, as can be seen in FIGS. 3 and 4, by the different angles of the adapter 46 and the inlet end 52 of the seed boot 42. The second end 74 of the adapter 46 thus has an inner annular surface defining the cavity 82 that is not concentric with the outer surface of the adapter 46 at the second end 74.

In operation as the seeding machine, with its planting units 10, is pulled through a field by a tractor, each furrow opener 20 forms a planting furrow. Seeds metered through the seed tube 18 are directed downward and rearward and exit the outlet end 54 of the seed boot 42 into the planting furrow. The seeds are pressed into the bottom of the planting furrow by the seed press wheel 24. The closing wheel 30 collapses the planting furrow covering the seeds with a loose layer of soil.

In the case of planting units with single disk furrow openers, as in the illustrated example, the planting furrow may have a relatively small dimension, for example, being only ½ inch wide by ½-1½ inches deep. The boot liner 44 reduces or eliminates rough and uneven surfaces and sharp angles in the seed boot 42 that the seeds may otherwise encounter and impinge against as they were deposited from the seed tube 18. This not only reduces the likelihood of seeds being caught within the seed boot 42, and thus possibly narrowing the passageway or forming an obstruction, but also reduces uncontrolled movement or "bouncing" of the seeds within the seed boot 42, which, along with the narrowed open area of the boot liner 44, provides a more consistent and focused trajectory of the seeds as they exit from the seed boot 42. The trajectory of the seeds is also focused by the lateral narrowing, or nozzling, of the boot liner 44 at the outlet end 54 of the seed boot 42, which tends to reduce the lateral dimension of the spray of seeds, and thus better directs the seeds into the narrow width of the planting furrow. The seed flap 58 may also inhibit the seeds from taking an improper trajectory and direct the seeds toward the planting furrow. These features of the seed boot assembly 40 reduce the incidence of seeds missing the planting furrows and aid in more consistent spacing of the seeds deposited into the planting furrows, and may also reduce damage to the seeds themselves, and thereby improve crop yield.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A seed boot assembly for a seeding machine, comprising:
    a seed boot having an internal cavity extending from an inlet to an outlet; and
    a boot liner extending within the internal cavity of the seed boot between the inlet and the outlet;
    wherein the boot liner defines a seed passageway that focuses a trajectory of a seed passing through the inner cavity of the seed boot; and
    wherein the inlet opening of the boot liner has a circular cross-section and the outlet opening of the boot liner has a non-circular opening.

2. The seed boot assembly of claim 1, wherein the seed boot is a casting; and
    wherein the boot liner is an inner tube having a continuous smooth inner surface.

3. The seed boot assembly of claim 2, wherein the inner tube is a flexible non-metallic tube.

4. The seed boot assembly of claim 1, wherein the boot liner has an outlet opening that is narrowed in at least one dimension at the outlet of the internal cavity of the seed boot than an inlet opening at the inlet of the internal cavity of the seed boot.

5. The seed boot assembly of claim 1, wherein the boot liner has an inner surface and an outer surface; and
    wherein, at least in part, the outer surface of the boot liner is spaced from the seed boot between its ends.

6. The seed boot assembly of claim 5, wherein the inlet of the seed internal cavity of the seed boot opens about a reference axis that is at an angle with respect to a reference axis about which opens the outlet of the internal cavity of the seed boot; and
    wherein ends of the boot liner open about reference axes at an angle with respect to one another that is greater than the angle between the reference axes of the internal cavity of the seed boot.

7. The seed boot assembly of claim 1, wherein the internal cavity of the seed boot slopes downward and rearward from the inlet to the outlet with respect to a direction of travel of the seeding machine.

8. The seed boot assembly of claim 1,
    wherein the boot liner couples to a seed tube adapter; and
    wherein the seed tube adapter couples to the seed boot.

9. The seed boot assembly of claim 8, wherein the seed tube adapter has an inlet opening that is larger than an outlet opening and a smooth inner surface transitioning between the inlet opening and the outlet opening of the seed tube adapter.

10. The seed boot assembly of claim 9, wherein a cross-sectional area of the outlet opening of the seed tube adapter is smaller than a cross-sectional area of the boot liner at the interface with the seed tube opening.

11. A planting unit for a seeding machine, the planting unit comprising:
    a planter unit frame;
    a furrow opener disk rotatably mounted to the planter unit frame; and
    a seed boot assembly, including:
        a seed boot having an internal cavity extending from an inlet to an outlet; and
        a boot liner extending within the internal cavity of the seed boot between the inlet and the outlet;
        wherein the boot liner defines a seed passageway that focuses a trajectory of a seed passing through the inner cavity of the seed boot; and
        wherein the boot liner has an outlet opening that is narrowed in at least one dimension at the outlet of the internal cavity of the seed boot than an inlet opening at the inlet of the internal cavity of the seed boot.

12. The planting unit of claim 11, wherein the seed boot is a casting; and
    wherein the boot liner is an inner tube having a continuous smooth inner surface.

13. The planting unit of claim 12, wherein the inner tube is a flexible non-metallic tube.

14. The planting unit of claim 11, wherein the inlet opening of the boot liner has a circular cross-section and the outlet opening of the boot liner has a non-circular opening.

15. The planting unit of claim 11, wherein the boot liner has an inner surface and an outer surface; and
    wherein, at least in part, the outer surface of the boot liner is spaced from the seed boot between its ends.

16. The planting unit of claim 15, wherein the inlet of the internal cavity of the seed boot opens about a reference axis that is at an angle with respect to a reference axis about which opens the outlet of the internal cavity of the seed boot; and
    wherein ends of the boot liner open about reference axes at an angle with respect to one another that is greater than the angle between the reference axes of the internal cavity of the seed boot.

17. The planting unit of claim 11, wherein the internal cavity of the seed boot slopes downward and rearward from the inlet to the outlet with respect to a direction of travel of the seeding machine.

18. The planting unit of claim 11, further including a seed tube and a seed tube adapter;
    wherein the boot liner couples to the seed tube adapter; and
    wherein the seed tube adapter couples to the seed boot and to the seed tube.

* * * * *